(12) United States Patent
Schellekens et al.

(10) Patent No.: US 11,220,302 B2
(45) Date of Patent: Jan. 11, 2022

(54) ROOF FAIRING FOR A LONG HAUL TRUCK

(71) Applicant: SABIC GLOBAL TECHNOLOGIES B.V., Bergen op Zoom (NL)

(72) Inventors: Geert Jan Schellekens, Geleen (NL); Max Morton, Geleen (NL); Carlos Pereira, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 39 days.

(21) Appl. No.: 16/771,024

(22) PCT Filed: Nov. 27, 2018

(86) PCT No.: PCT/EP2018/082721
§ 371 (c)(1),
(2) Date: Jun. 9, 2020

(87) PCT Pub. No.: WO2019/115223
PCT Pub. Date: Jun. 20, 2019

(65) Prior Publication Data
US 2021/0179206 A1  Jun. 17, 2021

Related U.S. Application Data

(60) Provisional application No. 62/598,706, filed on Dec. 14, 2017.

(51) Int. Cl.
*B62D 35/00* (2006.01)
(52) U.S. Cl.
CPC ................... *B62D 35/001* (2013.01)
(58) Field of Classification Search
CPC .................................................. B62D 35/001
See application file for complete search history.

(56) References Cited

U.S. PATENT DOCUMENTS 3,696,732 A    10/1972 Rodgers
3,910,623 A *  10/1975 McKeen .............. B62D 35/001
                                              296/91
(Continued)

FOREIGN PATENT DOCUMENTS

WO    2016077669 A1    5/2016

OTHER PUBLICATIONS

International Search Report for the corresponding INternational Application No. PCT/EP2018/082721; International Filing Date: Nov. 27, 2018; dated Jun. 3, 2019; 10 pages.
(Continued)

*Primary Examiner* — Lori L Lyjak
(74) *Attorney, Agent, or Firm* — Cantor Colburn LLP

(57) ABSTRACT

The invention relates to a drag-reducing aerodynamic component, comprising a body attachable to a roof of a vehicle, wherein the body comprises an air flow duct with a duct inlet at a front end of the body, and a duct outlet and a rear end of the body, located at a distance different from zero from the front end. The invention also relates to a vehicle comprising such a drag reducing component, wherein the body is attached to a roof of the vehicle and air flows through the air flow duct and is directed toward the rear end of the body, such that air stagnation is reduced around the vehicle and air flow is accelerated between the vehicle and a trailer attached to the vehicle to prevent air recirculation between the vehicle and the trailer, thereby reducing air pressure around and drag on the vehicle.

18 Claims, 3 Drawing Sheets

(56) References Cited

U.S. PATENT DOCUMENTS

| | | | |
|---|---|---|---|
| 4,006,931 A | | 2/1977 | Groves |
| 4,343,506 A | * | 8/1982 | Saltzman ............. B62D 35/001 |
| | | | 105/1.2 |
| 4,357,045 A | * | 11/1982 | Kinford, Jr. ......... B62D 35/001 |
| | | | 296/180.2 |
| 5,317,880 A | * | 6/1994 | Spears ................. B62D 35/001 |
| | | | 188/264 A |
| 5,340,190 A | | 8/1994 | Engel |
| 2013/0241231 A1 | * | 9/2013 | Rode .................... B60K 11/085 |
| | | | 296/180.3 |

OTHER PUBLICATIONS

Written Opinion for the corresponding INternational Application No. PCT/EP2018/082721; International Filing Date: Nov. 27, 2018; dated Jun. 3, 2019; 5 pages.

\* cited by examiner

ROOF FAIRING FOR A LONG HAUL TRUCK

CROSS REFERENCE TO RELATED APPLICATIONS

This application is a National Stage application of PCT/EP2018/082721, filed Nov. 27, 2018, which claims the benefit of U.S. Provisional Application No. 62/598,706, filed Dec. 14, 2017, both of which are incorporated by reference in their entirety herein.

BACKGROUND OF THE INVENTION

Field of the Invention

The present invention relates to a roof fairing or a drag-reducing aerodynamic component for a long haul truck. Furthermore, the invention relates to a truck integrating such a component or roof fairing.

Description of the Related Art

Vehicle original equipment manufacturers and fleet owners are continually looking for solutions to improve vehicle mileage and emissions. Regulations are currently being drafted worldwide that will enforce the further reduction of vehicle emissions.

Developments in aerodynamics have long been assumed to yield advancements in vehicle fuel efficiency. It can be difficult to improve vehicle mileage (e.g., through improved fuel economy) and emissions. However, increasing vehicle miles per gallon and reducing vehicle emissions can be advantageous in terms of lowering operating costs and complying with emission and fuel economy regulatory requirements. For example, truck original equipment manufacturers (OEMs) as well as owners of fleets of trucks continually desire improved vehicle mileage and reduced emissions to reduce operating costs and be more environmentally friendly. For example, a model Class 8 tractor-trailer can weigh up to approximately 37,000 kilograms (kg) (approximately 80,000 pounds) and can have a wind averaged drag coefficient ($C_D$) of approximately 0.60. At a highway speed of 65 miles per hour (mph) (104.6 kilometers per hour (kph)), about 65% of the total energy expended goes to overcome the aerodynamic drag. Hence, fuel savings and cost of operating a vehicle, e.g., a truck, can be optimized by improving aerodynamic performance. Contributors to aerodynamic drag of a tractor-trailer combination can include stagnation pressures at a front end, turbulent in-flows at a gap between the truck tractor and the trailer, underside flow, and wake at a rear of the trailer. An optimized design of the roof fairing can allow a reduction in stagnation pressure. An optimized design of the roof fairing can allow a minimization of upper in-flows at the tractor-trailer gap. An optimized design of the roof fairing can allow a favorable alteration of the trailer wake.

Thermoset and fiberglass reinforced plastic materials are currently used, but these materials are limited in their forming operations. Solutions which can improve vehicle mileage and reduce vehicle emissions are continually desired.

BRIEF SUMMARY OF THE INVENTION

Disclosed herein is a drag-reducing aerodynamic component for a vehicle, e.g. a roof fairing, wherein the aerodynamic components can be composed from a thermoplastic material. According to the invention, there is provided a drag-reducing aerodynamic component, comprising a body attachable to a roof of a vehicle, wherein the body comprises an air flow duct with a duct inlet at a front end of the body, and a duct outlet and a rear end of the body, located at a distance different from zero from the front end.

The roof fairings disclosed herein can achieve at least a 2% reduction in cumulative drag as compared to a base line design roof fairing, up to about 2.5 to 3%. Under the well-established 2:1 relationship between delta drag and fuel use, the fuel efficiency can be improved by nearly 1.3% from the baseline design. (AIAA Paper 2004-2249, by Rose McCallen and others (National Labs and NASA); Reducing Aerodynamic Drag and Fuel Consumption", Dr. Fred Browand, Aerospace and Mechanical Engineering, Viterbi School of Engineering Presented at University of Southern California for Global Climate & Energy Project Workshop on Advanced Transportation, Oct. 10-11, 2002.) The AIAA paper states that overcoming aerodynamic drag represents about 65% of total energy expenditure for a typical heavy truck running at a steady 70 miles per hour (mph) and uses a 2:1 ratio between delta drag and fuel use in projection fuel savings. Browand shows an equation with a factor that is dependent on the driving cycle where the factor ranges from 0.5 to 0.7. If the 0.5 factor value is used and the equation is rearranged, the 2:1 ratio can be derived to describe that a 2% reduction in the drag coefficient will result in a 1% reduction in fuel consumption. The concepts disclosed include an optimized shape to manage the airflow over the vehicle and enable reduced drag and increased fuel economy. Air flow ducts developed for injection molding processes can limit the air stagnation on the front of the trailer as well as accelerate and control the direction of the air flow. CFD models have validated this concept.

The aerodynamic component is designed to reduce drag on the vehicle which in turn, increases fuel economy. In an embodiment, the body comprises at least two air flow ducts, each with a duct outlet at the rear end of the body. The drag-reducing aerodynamic component can be attached to a roof of a vehicle, through the body of the component. This attachment can be done by means of brackets, form fit, bolts and nuts, or even adhesives.

The air channels or air flow ducts formed in the body assists in limiting frontal air stagnation. The air channels formed in the aerodynamic components assist in accelerating the air flow of air contacting the vehicle and in controlling, directing, or redirecting the air flow around the vehicle.

Drag can be described as the retarding force acting on a body moving through a fluid (i.e., air) parallel and opposite to the direction of motion. Optimization of airflow around some vehicle components can reduce a vehicle's drag and therefore can increase a vehicle's fuel economy while also reducing emissions. The vehicle components can include a truck tractor and trailer. The aerodynamic components disclosed herein can include a roof fairing on a truck tractor roof to reduce the drag experienced by the truck. The aerodynamic components can include a bulbous shape to redirect and redistribute air upward and around the truck tractor and trailer. The aerodynamic component includes air inlets on the roof fairing that allow air to pass through the roof fairing and be directed around the truck, thereby reducing the drag experienced by the truck. The aerodynamic component includes air channels or air flow ducts formed on the body to direct the airflow around the truck, thereby reducing the drag experienced by the truck. The aerodynamic components can include airflow guide vanes or louvres that allow air to pass through the roof fairing and that can optionally direct the airflow around the truck to reducing the track experienced by the truck.

The aerodynamic component disclosed herein allows control air flow around a vehicle, e.g., a truck tractor and trailer, which can restrict and accelerate the air flow vertically up and around the tractor and trailer. Such a design can assist in preventing air stagnation or recirculation between the truck tractor and the trailer, both of which would increase the drag. For example, the drag-reducing aerodynamic components when attached to a vehicle can provide a 1% to 2% increase in fuel economy as compared to the baseline roof fairing attached to the same vehicle. The drag-reducing aerodynamic component can provide the vehicle with at least a 1% improvement in fuel economy as compared to a vehicle with a baseline roof fairing, up to about 1.3%. The base line design roof fairing for long haul trucks incorporate aerodynamic aspects already. However, as this kind of truck operate continuously and travel greater distances compared to day trucks, the shown improvement in fuel economy is significant.

Preferably, the body comprises an inner shell part and an outer shell part that enclose an interior space that forms the air flow duct. The body of the aerodynamic component or roof fairing can be formed integrally or in multiple pieces and assembled. In designs in which louvres or airflow guide vanes are present in the aerodynamic component, multiple pieces can be formed and thereafter assembled. For example, the inner and outer shell parts may be adjacent at a top end of the body, thereby forming two air flow ducts at each side of the body, wherein each air flow duct has a duct outlet at the rear end of the body.

The roof fairing can be attached to the roof of the cabin, i.e. the body can be attached and/or adjacent to an exterior surface of the roof of the cabin. Alternatively, the roof fairing may form the roof of the cabin, i.e. the body, in particular the inner shell part of the body, forms an outer boundary of the sleeping section, or the living quarters, of the cabin. The roof may further be constructed as a framework for structural integrity, with the inner shell part covering and closing the framework. The latter situation may be applicable to long haul trucks with a raised roof.

According to an embodiment, the body comprises a central fairing extending from a roof of a vehicle, e.g. a cabin of a truck, and side fairings disposed on an exterior surface at each side of the central fairing, forming air flow ducts at each side of the central fairing. The central fairing can extend from an existing roof of a vehicle or it can also form the roof of the vehicle. Side fairings can be disposed on either side of the central fairing. For example, the side fairings can be disposed on either exterior end surface of the central fairing. The duct inlet may be provided with louvres or airflow guide vanes, located at an interior of the body, wherein the louvres guide an air flow through the duct. The airflow guide vanes may protrude from an interior surface of the side fairings. The airflow guide vanes can be attached to an exterior surface, for example, an exterior end surface of the central fairing. As a result, air can flow through the airflow guide vanes and can be directed toward a top and/or a side-rear of the vehicle to reduce air stagnation around the vehicle.

The airflow guide vanes of the side fairings can be attached to the central fairing. Attachment of the airflow guide vanes to the side fairings can include mechanical attachments, e.g., hooks, screws, snap-fit, etc.; chemical attachments, e.g., adhesives; or a combination of mechanical attachments and chemical attachments. The louvres may protrude from the interior surfaces of the side fairings such that the louvres attach to an exterior end surface of the central fairing. For example, the air flow guide vanes can slide into corresponding recesses disposed on the exterior end surfaces of the central fairing. The airflow guide vanes can be mechanically attached to the recesses. The airflow guide vanes can be chemically attached to the recesses. The airflow guide vanes can be mechanically and chemically attached to the recesses.

The central fairing and/or the inner shell part may have a convex shape at the front end, wherein an exterior surface coincides with a convex side of the central fairing and/or the inner shell. The body itself may have a diverging shape, with the body diverging from the front end to the rear end.

The body further may comprise one or several air venturi at the rear end of the body, aligned with the duct outlet, wherein the duct outlet is located between the air venturi and the front end of the body, and wherein the venturi narrows towards the rear end. The venturi adds to the drag reduction by forming an air curtain behind the rear end of the body, i.e. away from the front end.

According to a further embodiment, at least one air venturi is provided at a top side of the body, aligned with the front end and located at the rear end of the body, and wherein the venturi narrows towards the rear end. One or more air venturies at a top side of the body can decrease the front drag of a vehicle or truck. This is a net positive effect of an increase of air impingement at the front end and an increase in the air pressure between the trailer and the truck.

The aerodynamic component, for instance the body, can comprise any thermoplastic material or combination of several thermoplastic materials that can be formed into the desired shape and provide the desired properties. Combinations with elastomeric and thermoset materials are possible as well. Possible thermoplastic materials include polybutylene terephthalate (PBT); acrylonitrile-butadiene-styrene (ABS, CYCOLOY™ resins, commercially available from SABIC's Innovative Plastics business); polycarbonate (LEXAN™ and LEXAN™ EXL resins, commercially available from SABIC's Innovative Plastics business); polyethylene terephthalate (PET); polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide (NORYL GTX™ resins, commercially available from SABIC's Innovative Plastics business); blends of polycarbonate/PET/PBT; PBT and impact modifier (XENOY™ resins, commercially available from SABIC's Innovative Plastics business); polyamides (Nylon 6, Nylon 6-6, Nylon 6-9, Nylon 6-10, Nylon 6-12, Nylon 11, Nylon 12, Nylon 4-6, etc.); phenylene sulfide resins; polyvinyl chloride (PVC); high impact polystyrene (HIPS); polyolefins, e.g., low/high density polyethylene (L/HDPE), polypropylene (PP), expanded polypropylene (EPP); polyethylene and fiber composites; polypropylene and fiber composites (AZDEL Superlite™ sheets, commercially available from Azdel, Inc.); long fiber reinforced thermoplastics (VERTON™ resins, commercially available from SABIC's Innovative Plastics business), thermoplastic olefins (TPO), and carbon fiber reinforced thermoplastic composites (CFRP), as well as combinations comprising at least one of the foregoing.

An exemplary filled resin is STAMAX™ resin, which is a long glass fiber filled polypropylene resin also commercially available from SABIC's Innovative Plastics business. Some possible reinforcing materials include fibers, such as glass, carbon, and so forth, as well as combinations comprising at least one of the foregoing; e.g., long glass fibers and/or long carbon fiber reinforced resins. For example, carbon fiber reinforced thermoplastic composites can be utilized to form the lobes. Carbon fiber reinforced thermoplastic composites can be used as a coating (e.g., skin) on the lobes to provide the desired structural integrity to the lobes. The lobes can be formed from combinations comprising at least one of any of the above-described materials.

The invention also relates to a vehicle comprising the component of as described above, wherein the body is attached to a roof of the vehicle and air flows through the air flow duct and is directed toward the rear end of the body, such that air stagnation is reduced around the vehicle and air flow is accelerated between the vehicle and a trailer attached to the vehicle to prevent air recirculation between the vehicle and the trailer, thereby reducing air pressure around and drag on the vehicle, preferably a long haul truck having a sleeper cabin or living quarters.

The inner shell part or the central fairing may be attached to the roof of the vehicle and the outer shell part or the side fairings are attached to the inner shell part or the central fairing, respectively.

BRIEF DESCRIPTION OF THE DRAWINGS

The features and advantages of the invention will be further appreciated upon reference to the following drawings of a number of exemplary embodiments, in which.

DESCRIPTION OF ILLUSTRATIVE EMBODIMENTS

Figure 1:
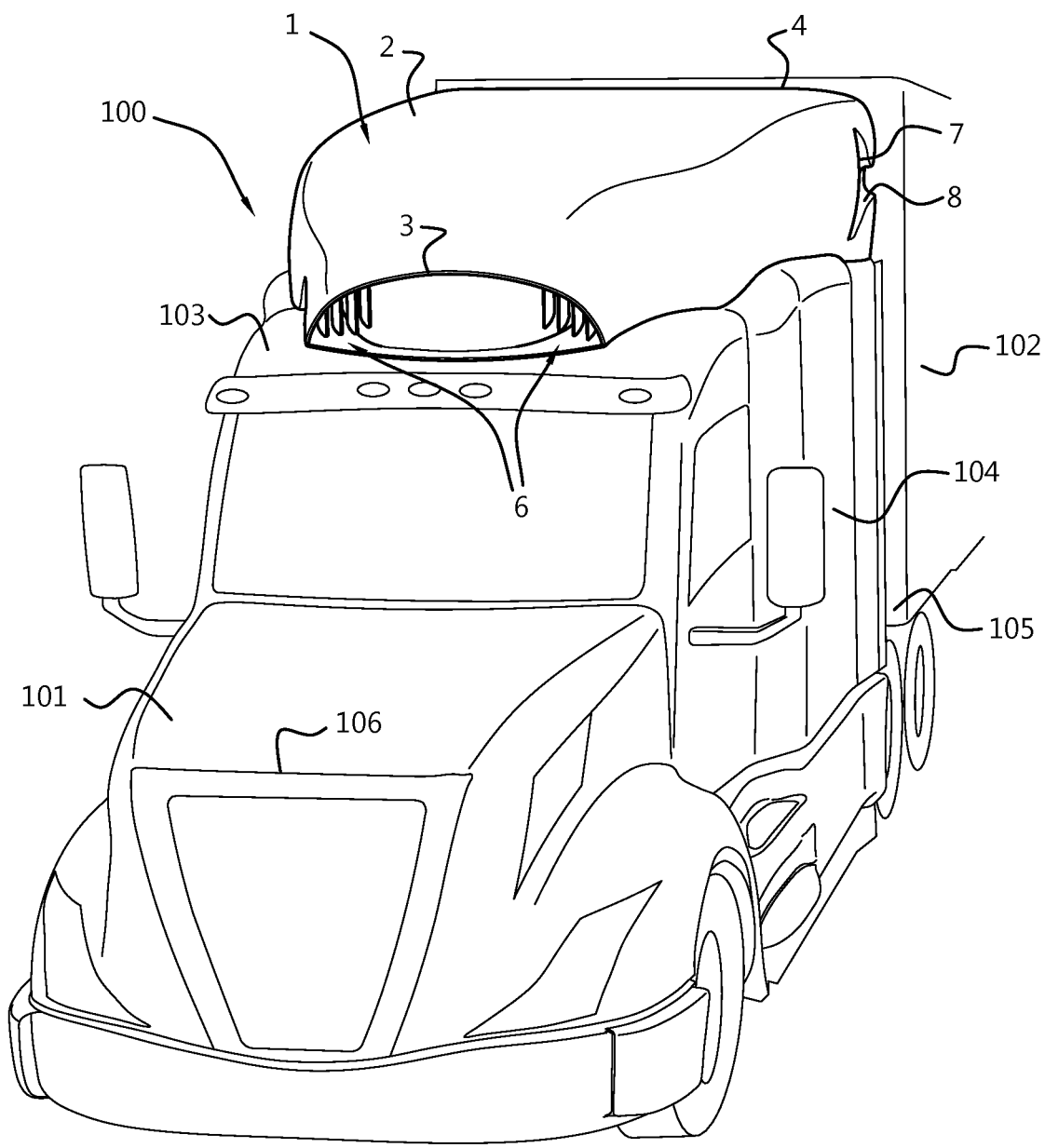
FIG. 1 shows a long haul truck with a drag-reducing aerodynamic component attached to a roof of a cabin in perspective view.

FIG. 1 shows a long haul truck 100 with a drag-reducing aerodynamic component or roof fairing 1 provided on a cabin 101 in perspective view. The long haul truck 100 is characterized by the cabin 101 that has a sleeping section or sleeper cabin 104, see also FIG. 3, and has a greater length than a day truck. Another characterization is that a long haul truck is usually used for distances over 250 miles, and day trucks for distances up to 150 to 250 miles. The truck 100 further has a trailer 102. Between the trailer 102 and the cabin 101, a tractor trailer gap 105 is located, see also FIGS. 2 and 3.

The drag-reducing aerodynamic component 1 comprises a body 2 with a front end 3 and a rear end 4. The rear end 4 is directed towards the gap 105 and the front end 3 is directed towards a front 106 of the cabin. The body further comprises an air flow duct 5, see FIG. 4, with a duct inlet 6 at the front end 3 and a duct outlet 7 at the rear end 4 of the body 2. Between the duct outlet 7 and the rear end 4, an air venturi 8 is located at a side of the body 2. The air venturi 8 narrows towards the rear end 4, see also FIG. 3, to accelerate the air flow exiting the air flow duct 5 at the duct outlet 7. The accelerated air flow allows the gap between the cabin 101 and the trailer 102 to be bridged, therefore preventing the air to recirculate in between, which would increase drag.

Figure 2:
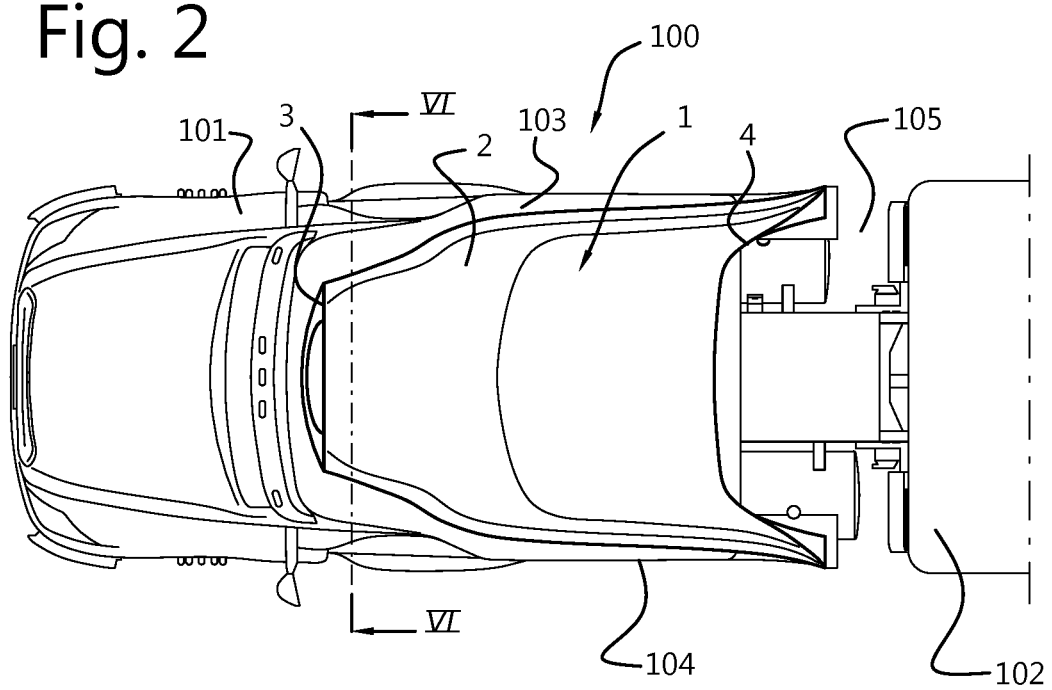
FIG. 2 shows a top view of the long haul truck with a drag-reducing aerodynamic component of FIG. 1.

FIG. 2 shows a top view of the long haul truck 100 with the drag-reducing aerodynamic component 1 of FIG. 1. This figure shows the converging shape of the body 2 from the front end 3 to the rear end 4.

Figure 4:
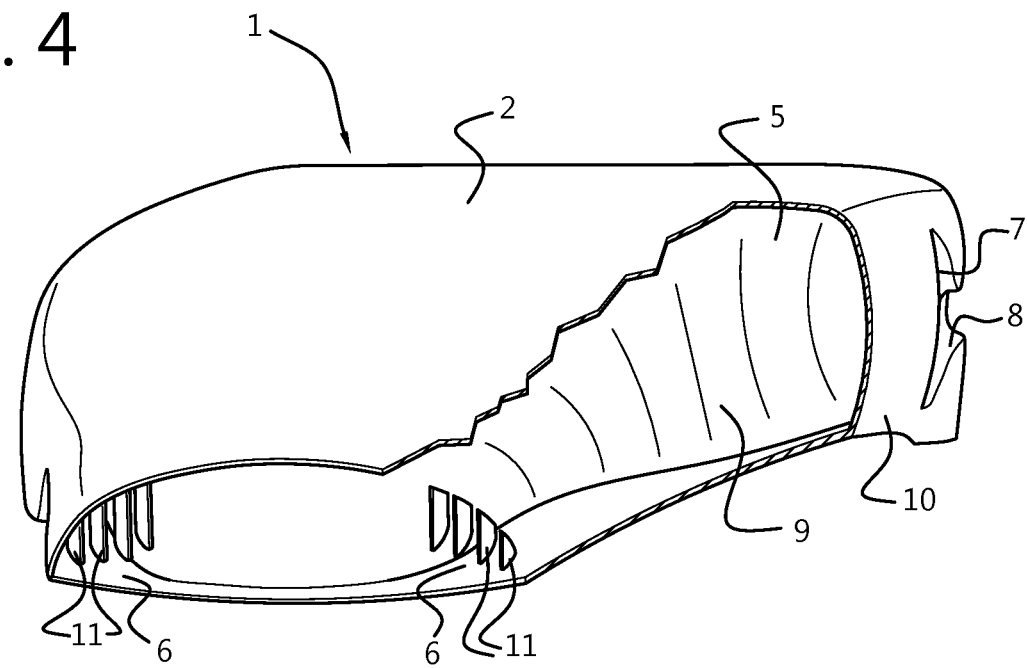
FIG. 4 shows a perspective front view with a cut-out of the drag-reducing aerodynamic component.

FIG. 4 shows a perspective front view with a cut-out of the drag-reducing aerodynamic component. The body 2 comprises and inner shell part 9 and an outer shell part 10 that enclose an interior space forming the air flow duct 5. The air flow duct 5 is provided at each side of the body 2, with each air flow duct 5 having a duct inlet 6 and a duct outlet 7. The duct inlet 6 is provided with louvres or air guide vanes 11 that allow air to pass through the roof fairing of drag-reducing aerodynamic component 1 and that can direct the airflow around the truck 100 to reduce the track experienced by the truck 100. The roof fairing 1 can be attached to the roof 103 of the cabin 101, i.e. the body 2 is attached to an exterior surface of the roof 103 of the cabin 101. Alternatively, the roof fairing forms the roof of the cabin, i.e. the body 2, in particular the inner shell part 9, forms the outer boundary of the sleeping section, or the living quarters, of the cabin. The roof 103 may further be constructed as a framework for structural integrity, with the inner shell part 9 covering and closing the framework. The latter situation may be applicable to long haul trucks with a raised roof.

The body 2 is attached to the roof 103 of the cabin 101 via the inner shell part 9. The outer shell part 10 is attached to the inner shell part 9 to form the body 2.

Figure 5:
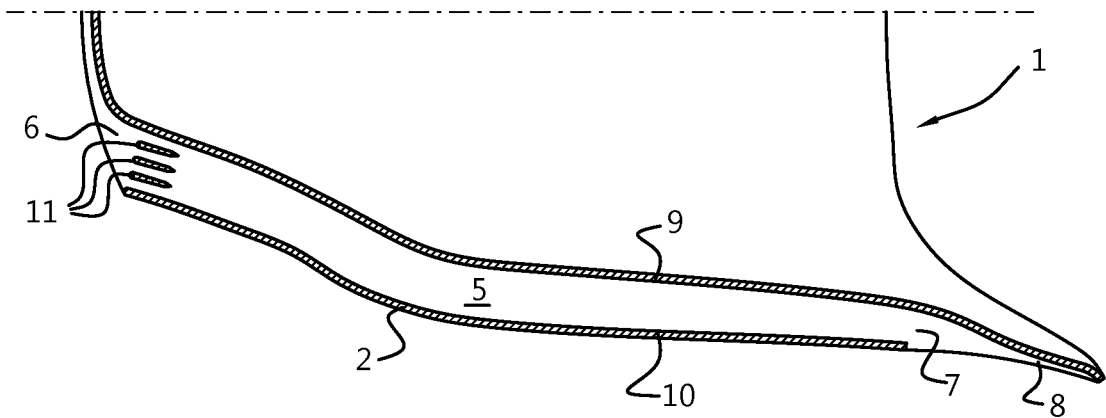
FIG. 5 shows a cross section of the drag-reducing aerodynamic component along line V-V of FIG. 3.
Figure 6:
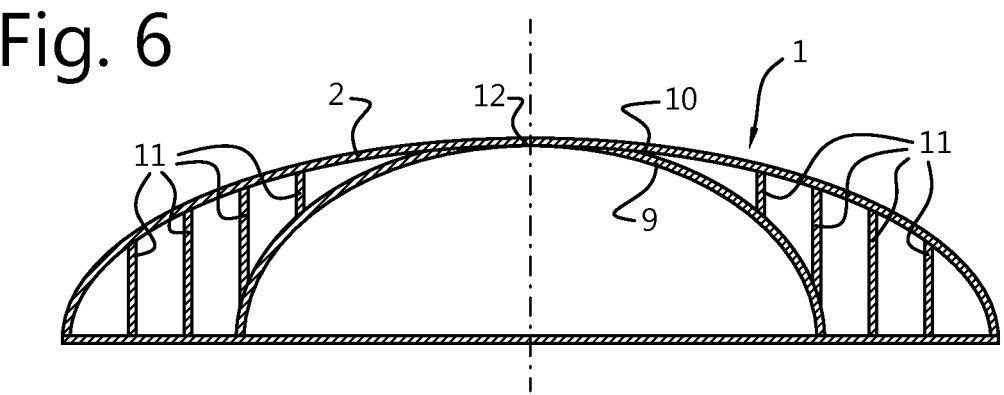
FIG. 6 shows a cross section of the drag-reducing aerodynamic component along line VI-VI of FIG. 2.

The airflow guide vanes 11 extend vertically from an interior surface of the outer shell part 10 towards the inner shell part 9, see also FIGS. 5 and 6. Alternatively, the airflow guide vanes 11 can extend horizontally from the interior surface of the outer shell part 10. This can be at an angle in either the longitudinal or tangential direction of the vanes 11. The angle at which the air flow guide vanes extend can be 0° to 90°.

Figure 3:
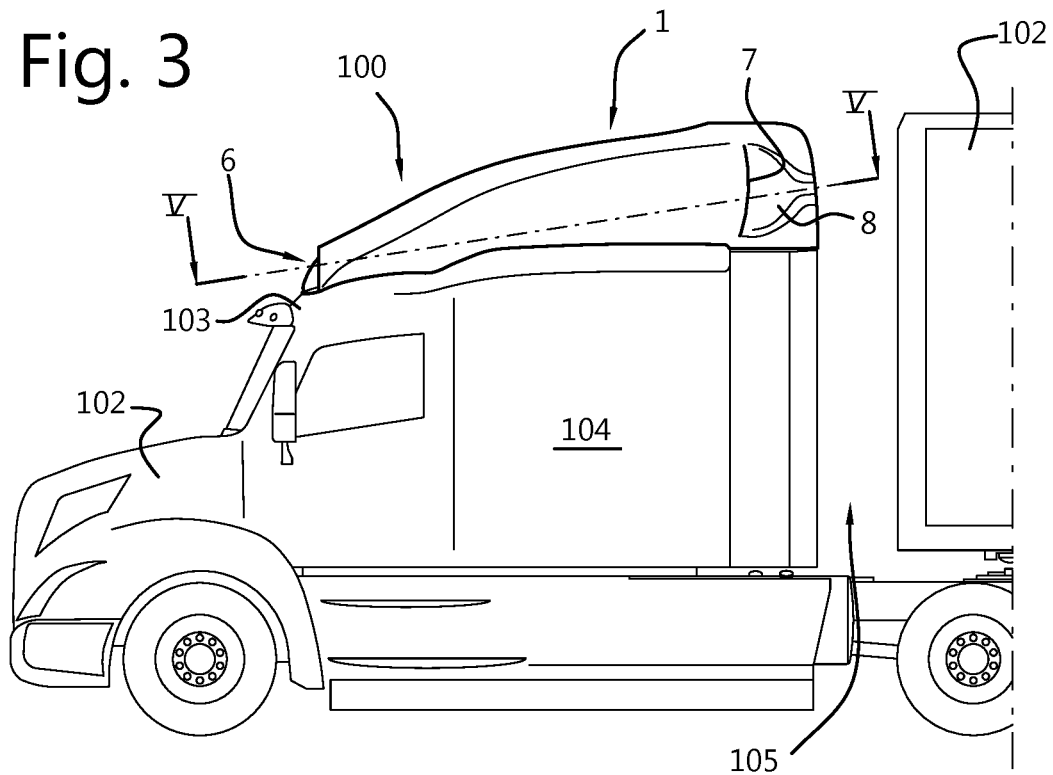
FIG. 3 shows a side view of the long haul truck with a drag-reducing aerodynamic component.

FIG. 5 shows a cross section of the drag-reducing aerodynamic component along line V-V of FIG. 3, and clearly shows the air flow duct 5 formed between the inner shell part 9 and the outer shell part 10. The louvres 11 at the duct inlet 6 are directed parallel to the desired air flow direction towards the duct outlet 7 and the air venturi 8.

FIG. 6 shows a cross section of the drag-reducing aerodynamic component along line VI-VI of FIG. 2, and clearly shows that the inner and outer shell parts 9, 10 are adjacent at a top end 12 of the body 2, thereby forming the two air flow ducts 5 at each side of the body 2.

LIST OF ITEMS

1. Drag-reducing aerodynamic component
2. Body
3. Front end
4. Rear end
5. Air flow duct
6. Duct inlet
7. Duct outlet
8. Air venturi
9. Inner shell part
10. Outer shell part
11. Louvres
12. Top end
100. Truck
101. Cabin 102. Trailer
103. Roof
104. Sleeping section
105. Tractor Trailer Gap
106. Front

The invention claimed is:

1. A drag-reducing aerodynamic component, comprising a body attachable to a roof of a vehicle, wherein the body comprises an air flow duct with a duct inlet at a front end of the body, and a duct outlet on a side of the body at a rear end of the body, located at a distance different from zero from the front end.

2. The component according to claim 1, wherein the body comprises an inner shell part and an outer shell part that enclose an interior space that forms the air flow duct.

3. The component according to claim 1, wherein the body comprises at least two air flow ducts, each with a duct outlet at the rear end of the body.

4. The component according to claim 1, wherein the inner and outer shell parts are adjacent at a top end of the body, thereby forming two air flow ducts at each side of the body, wherein each air flow duct has a duct outlet at the rear end of the body.

5. The component according to claim 1, wherein the body comprises a central fairing extending from a roof of a vehicle; and
    side fairings disposed on an exterior surface at each side of the central fairing, forming air flow ducts at each side of the central fairing.

6. The component according to claim 1, wherein the duct inlet is provided with louvres, located at an interior of the body, wherein the louvres guide an air flow through the duct.

7. The component according to claim 6, wherein the louvres protrude from the interior surfaces of the side fairings and wherein the louvres attach to an exterior end surface of the central fairing.

8. The component according to claim 1, wherein the body further comprises an air venturi at the rear end of the body, aligned with the duct outlet, wherein the duct outlet is located between the air venturi and the front end of the body, and wherein the venturi narrows towards the rear end.

9. The component according to claim 1, wherein at least one air venturi is provided at a top side of the body, aligned with the front end and located at the rear end of the body, and wherein the venturi narrows towards the rear end.

10. The component according to claim 1, wherein the body has a diverging shape, with the body diverging from the front end to the rear end.

11. The component according to claim 1, wherein the body comprises a thermoplastic material selected from polybutylene terephthalate; acrylonitrile-butadiene-styrene; polycarbonate; polyethylene terephthalate; acrylic-styrene-acrylonitrile; acrylonitrile-(ethylene-polypropylene diamine modified)-styrene; phenylene ether resins; polyamides; phenylene sulfide resins; polyvinyl chloride; high impact polystyrene; polyolefins; or a combination comprising at least one of the foregoing.

12. A vehicle comprising the component of claim 1, wherein the body is provided on a roof of the vehicle and air flows through the air flow duct and is directed toward the rear end of the body, such that air stagnation is reduced around the vehicle and air flow is accelerated between the vehicle and a trailer attached to the vehicle to prevent air recirculation between the vehicle and the trailer, thereby reducing air pressure around and drag on the vehicle wherein the duct outlet is on a side of the body and directs airflow around the vehicle.

13. The vehicle according to claim 12, wherein the body forms part of the roof of the vehicle.

14. The vehicle according to claim 12, wherein the inner shell part or the central fairing are attached to the roof of the vehicle and the outer shell part (10) or the side fairings are attached to the inner shell part or the central fairing, respectively.

15. The vehicle according to claim 12, being a long haul truck having a sleeper cabin.

16. The component of claim 1 having a bulbous shape.

17. A drag-reducing aerodynamic component, comprising a body attachable to a roof of a vehicle, wherein the body comprises an air flow duct with a duct inlet at a front end of the body, and a duct outlet at a rear end of the body, located at a distance different from zero from the front end, wherein the body comprises an inner shell part and an outer shell part that enclose an interior space that forms the air flow duct; the duct inlet is provided with louvres, located at an interior of the body, wherein the louvres guide an air flow through the duct; and the duct outlet is on the side of the outer shell.

18. The vehicle according to claim 12 characterized by one or more of the following: the body comprises an inner shell part and an outer shell part that enclose an interior space that forms the air flow duct; the duct inlet is provided with louvres, located at an interior of the body, wherein the louvres guide an air flow through the duct; and the body further comprises an air venturi at the rear end of the body, aligned with the duct outlet, wherein the duct outlet is located between the air venturi and the front end of the body, and wherein the venturi narrows towards the rear end.

* * * * *